(12) United States Patent
Schwendiman et al.

(10) Patent No.: US 7,302,448 B2
(45) Date of Patent: Nov. 27, 2007

(54) SYSTEM AND METHOD FOR MAINTAINING MULTIPLE DEVICES WITH A SINGLE DEVICE IDENTIFIER

(75) Inventors: Chris Alan Schwendiman, Round Rock, TX (US); Stephen M. Tee, Marble Falls, TX (US); Teerasit Tinnakul, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 10/960,606

(22) Filed: Oct. 7, 2004

(65) Prior Publication Data
US 2006/0080355 A1   Apr. 13, 2006

(51) Int. Cl.
*G06F 17/30* (2006.01)
(52) U.S. Cl. ............... 707/103 R; 360/135; 707/104.1
(58) Field of Classification Search ............. 707/103 R
See application file for complete search history.

(56) References Cited

U.S. PATENT DOCUMENTS 5,161,223 A * 11/1992 Abraham ..................... 707/3
6,397,221 B1 * 5/2002 Greef et al. ................. 707/102

* cited by examiner

Primary Examiner—Leslie Wong
Assistant Examiner—Yuk Choi
(74) Attorney, Agent, or Firm—Duke W. Yee; Diana R. Gerhardt; Lisa L. B. Yociss

(57) ABSTRACT

A method, computer program product, and a data processing system for maintaining object configuration data in a data processing system is provided. A first set of attribute entries is stored in a database. The first set of attribute entries is associated with a first object classification and a second object classification. A second set and a third set of attribute entries each including at least one attribute entry are stored in the database. The second set of attribute entries is associated with the first object classification, and the third set of attribute entries are associated with the second object classification. A first object of the first object classification is configured with the first set of attribute entries and the second set of attribute entries, and a second object of the second object classification is configured with the first set of attribute entries and the third set of attribute entries.

9 Claims, 4 Drawing Sheets

PdAt: 410a
- 411 — uniquetype = "disk/fcp/mydisk1"
- 412 — attribute = "queue_depth"
- 413 — deflt = "1"
- 414 — values = "1-256, 1"
- 415 — width = ""
- 416 — type = "R"
- 417 — generic = "UD"
- 418 — rep = "nr"
- 419 — nls_index = 30

PdAt: 410b
- 421 — uniquetype = "disk/fcp/mydisk1"
- 422 — attribute = "qtype"
- 423 — deflt = "single"
- 424 — values = "none, ordered, simple"
- 425 — width = ""
- 426 — type = "R"
- 427 — generic = "UD"
- 428 — rep = "sl"
- 429 — nls_index = 31

PdAt: 410c
- 431 — uniquetype = "disk/fcp/mydisk1"
- 432 — attribute = "unique_id"
- 433 — deflt = ""
- 434 — values = "240C80"
- 435 — width = ""
- 436 — type = "R"
- 437 — generic = "UD"
- 438 — rep = "nl"
- 439 — nls_index = 32

PdAt: 410d
- 441 — uniquetype = "disk/fcp/mydisk1"
- 442 — attribute = "model_map"
- 443 — deflt = "0810MYDISK MODEL ONE"
- 444 — values = ""
- 445 — width = ""
- 446 — type = "R"
- 447 — generic = ""
- 448 — rep = "s"
- 449 — nls_index = 0

PdAt: 450a
- 451 — uniquetype = "disk/fcp/mydisk2"
- 452 — attribute = "queue_depth"
- 453 — deflt = "1"
- 454 — values = "1-256, 1"
- 455 — width = ""
- 456 — type = "R"
- 457 — generic = "UD"
- 458 — rep = "nr"
- 459 — nls_index = 30

PdAt: 450b
- 461 — uniquetype = "disk/fcp/mydisk2"
- 462 — attribute = "qtype"
- 463 — deflt = "single"
- 464 — values = "none, ordered, simple"
- 465 — width = ""
- 466 — type = "R"
- 467 — generic = "UD"
- 468 — rep = "sl"
- 469 — nls_index = 31

PdAt: 450c
- 471 — uniquetype = "disk/fcp/mydisk2"
- 472 — attribute = "unique_id"
- 473 — deflt = ""
- 474 — values = "240C80"
- 475 — width = ""
- 476 — type = "R"
- 477 — generic = "UD"
- 478 — rep = "nl"
- 479 — nls_index = 32

PdAt: 450d
- 481 — uniquetype = "disk/fcp/mydisk2"
- 482 — attribute = "model_map"
- 483 — deflt = "0810MYDISK MODEL TWO"
- 484 — values = ""
- 485 — width = ""
- 486 — type = "R"
- 487 — generic = ""
- 488 — rep = "s"
- 489 — nls_index = 0

FIG. 5

501
```
PdAt: 510a
511 — uniquetype = "disk/fcp/mydisk"
512 — attribute = "queue_depth"
513 — deflt = "1"
514 — values = "1-256, 1"
515 — width = ""
516 — type = "R"
517 — generic = "UD"
518 — rep = "nr"
519 — nls_index = 30

PdAt: 510b
521 — uniquetype = "disk/fcp/mydisk"
522 — attribute = "q_type"
523 — deflt = "simple"
524 — values = "none, ordered, simple"
525 — width = ""
526 — type = "R"
527 — generic = "UD"
528 — rep = "sl"
529 — nls_index = 31

PdAt: 510c
531 — uniquetype = "disk/fcp/mydisk"
532 — attribute = "unique_id"
533 — deflt = ""
534 — values = "240C80"
535 — width = ""
536 — type = "R"
537 — generic = ""
538 — rep = "nl"
539 — nls_index = 79
```

500

502
```
PdAt: 510d
541 — uniquetype = "disk/fcp/mydisk"
542 — attribute = "model_map"
543 — deflt = "0810MYDISK MODEL ONE"
544 — values = ""
545 — width = ""
546 — type = "R"
547 — generic = ""
548 — rep = "s"
549 — nls_index = 0
```

503
```
PdAt: 510e
551 — uniquetype = "disk/fcp/mydisk"
552 — attribute = "model_map"
553 — deflt = "0810MYDISK MODEL TWO"
554 — values = ""
555 — width = ""
556 — type = "R"
557 — generic = ""
558 — rep = "s"
559 — nls_index = 0
```

SYSTEM AND METHOD FOR MAINTAINING MULTIPLE DEVICES WITH A SINGLE DEVICE IDENTIFIER

BACKGROUND OF THE INVENTION

1. Technical Field

The present invention relates generally to an improved data processing system and in particular to a data processing system and method for maintaining attributes of multiple devices in association with a single device identifier. Still more particularly, the present invention provides a mechanism for overriding device default values within a data structure of device attributes with a single device identifier maintained in association with devices of different device classifications.

2. Description of Related Art

A conventional operating system implementation utilizes a group of device attributes to define attributes of system objects, such as peripheral adapters and devices. For example, the AIX operating system uses a group of device attributes implemented as predefined attribute objects (PdAt) that are managed by an object data manager (ODM). Attributes of a particular device classification are collectively grouped together based on a unique device identifier—for example, a uniquetype value associated with a classification of devices.

A uniquetype may support more than one device by way of model_map stanza. Devices that share a uniquetype all share the same initial values for the attributes defined by default entries of the PdAt. Devices requiring one or more different default values for a common attribute must be defined with separate uniquetypes. Thus, the performance of such a device is limited during system boot, install and operation until vendor specific ODM data, e.g., a PdAt entry for the device, is supplied.

It would be advantageous to provide a mechanism for maintaining attributes of multiple device types or classifications in association with a single device classification identifier. It would be further advantageous to provide a mechanism for maintaining attributes of multiple device classification having identical attribute sets in association with a single device classification identifier. It would still be further advantageous to provide a mechanism for overriding device default values within a data structure that supports association of device attributes with multiple device classifications via a single device classification identifier.

SUMMARY OF THE INVENTION

The present invention provides a method, computer program product, and a data processing system for maintaining object configuration data in a data processing system. A first set of attribute entries is stored in a database. The first set of attribute entries is associated with a first object classification and a second object classification. A second set and a third set of attribute entries each comprising at least one attribute entry are stored in the database. The second set of attribute entries is associated with the first object classification, and the third set of attribute entries are associated with the second object classification. A first object of the first object classification is configured with the first set of attribute entries and the second set of attribute entries, and a second object of the second object classification is configured with the first set of attribute entries and the third set of attribute entries.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an exemplary configuration of attribute entries accessible by an object data manager implemented as is conventional;

FIG. 5 is an exemplary configuration of device attribute entries implemented in accordance with a preferred embodiment of the present invention.

DETAILED DESCRIPTION OF THE PREFERRED EMBODIMENT

Figure 1:
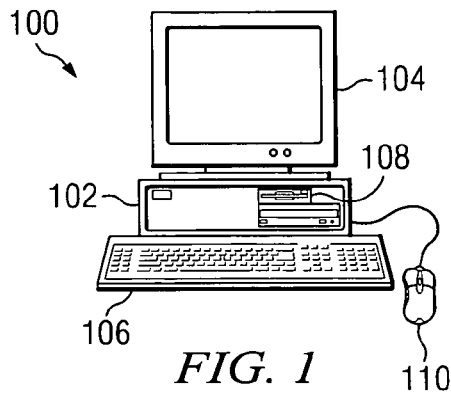
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM server computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
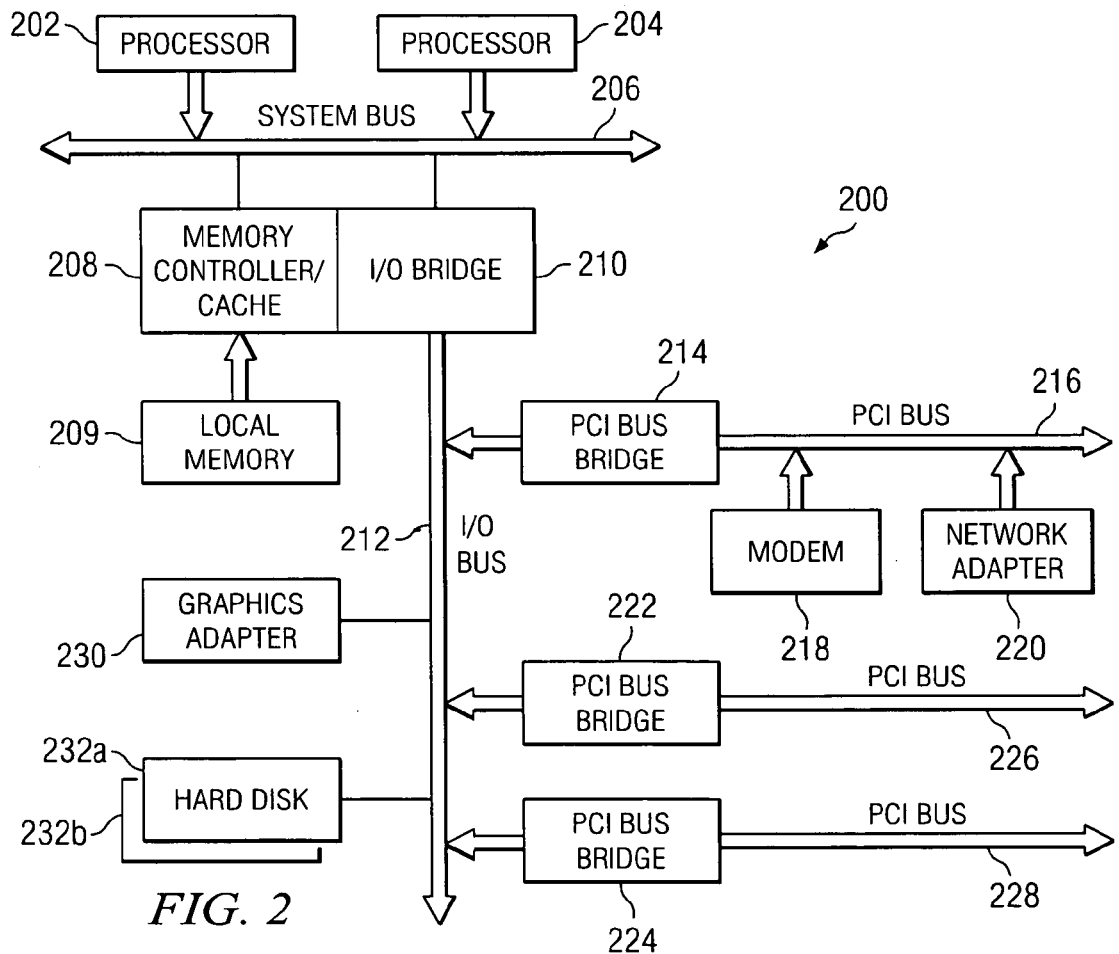
FIG. 2 is a block diagram of a data processing system in which a preferred embodiment of the present invention may be implemented.

Referring to FIG. 2, a block diagram of a data processing system that may be implemented as a server, such as computer 100 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disks 232a and 232b (collectively referred to as hard disks 232) may also be connected to I/O bus 212 as depicted, either directly or indirectly.

In the illustrative example, hard disks 232 is representative of two distinguishable hard disks. For example, hard disks 232a may have an identifier associated therewith representative of the manufacturer and model number of hard disk 232a, and hard disk 232b may have a identifier associated therewith representative of the manufacturer and model number of hard disk 232b.

For illustrative purposes, assume each of hard disks 232a and 232b have distinguishable identifiers. Various device attributes or parameters are stored by system 200 that facilitate configuration of hardware devices, such as hard disks 232, optical drives, other hardware devices or software devices, for proper operation thereof. The O/S of system 200 may retrieve such parameters, for example device attributes of hard disks 232, at boot up for initial configuration of hard disks 232 or during runtime to interact with hard disks 232. The present invention provides for a reduction in the quantity of configuration attribute data for supporting objects such as hard disks 232 as described more fully below.

As referred to herein, an attribute set is a collection of device attributes or parameters necessary for proper configuration of a device. Instances of devices sharing identical attributes and identical attribute values are associated with a respective attribute set via an identifier. In the AIX operating system, devices instances that are associated with an identical attribute set are associated with a uniquetype value. For example, instances of a hard disks having a common manufacturer and model number are assigned a common uniquetype and thus are configured with an attribute set that is associated with the uniquetype of the hard disk instances.

A device, such as a SCSI hard disk, may have an attribute set that is identical to another device of similar operational capabilities. In a conventional configuration of device attribute data, if one (or more) attribute of a first device has a different attribute value than that of the same attribute of a second device, a different attribute set is required to be stored on the data processing system. Various devices of similar operational capabilities may often have identical attributes with a small subset of the attributes having differing values between the devices. Thus, recordation of attribute sets for each of the similar devices results in attribute replication.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
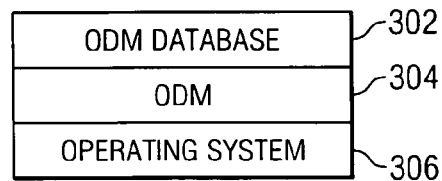
FIG. 3 is a diagrammatic illustration of a software architecture for implementation of a preferred embodiment of the present invention.

FIG. 3 is a diagrammatic illustration of a software architecture for implementation of a preferred embodiment of the present invention. Object data manager (ODM) 304 runs on operating system 306, such as an AIX instance, another Unix variant, or another suitable operating system. ODM 304 interfaces with ODM database 302. Particularly, ODM 304 may retrieve device attributes or configuration parameters maintained in ODM database 302. In a preferred embodiment, ODM database 302 includes predefined attribute (PdAt) entries although other data structures may be suitably substituted therefor. In the illustrative examples provided herein, PdAts representative of attributes of hard disks 232 are provided to facilitate an understanding of the invention. However, attributes for other device types may be similarly configured. The device attribute formats described herein generally conform with the AIX operating system, although teachings of the present invention may be extended to device attribute configurations of other operating systems such as other Unix variants.

FIG. 4 is an exemplary configuration of attribute entries accessible by an ODM implemented as is conventional. The device attribute entries shown are representative of PdAt entries for support of two device uniquetypes. Particularly, an attribute entry set 401 includes PdAt entries 410a-410d comprising attribute information associated with a device unique type specified by a uniquetype value (disk/fcp/mydisk1) in respective fields 411, 421, 431, and 440, and attribute entry set 402 includes PdAt entries 450a-450d comprising attribute information uniquely associated with a device uniquetype specified by a uniquetype value (disk/fcp/mydisk2) in respective fields 451, 461, 471 and 481.

In the illustrative example, the uniquetype value is a concatenation of a device class, a device subclass and a device type. For example, a device class may comprise all devices designated as disk devices, a subclass may comprise devices designated as SCSI devices, and a device type may comprise disk devices of a particularly storage capacity. In the examples provided herein, hard disk 232a comprises a disk device with a device class of disk, a device subclass of fcp, and a device type of mydisk1, and hard disk 232b comprises a disk device with a device class of disk, a device subclass of fcp, and a device type of mydisk2. The uniquetype value is derived by concatenating the device class, subclass, and device type with slash "/" delineators therebetween.

Each attribute entry includes various fields with each field having a specified value or null (designated " "). For example, each of attribute entries 410a-410d comprise respective fields 411-419, 421-429, 430-439 and 440-449. Each set of fields, e.g., fields 411-419, have respective field labels of uniquetype, attribute, default, values, width, type, generic, rep and nls_index. The particular fields shown, and the values or the lack thereof, assigned thereto, are illustrative only and are intended only to facilitate an understanding of the present invention.

Different system devices may have attributes unique thereto, may share attributes with other devices, or may have a combination of attributes that are shared among other devices as well as one or more attributes that are unique to the device. In the present example, hard disks 232*a* and 232*b* have identical attributes of queue_depth, q_type, unique_id, and model_map respectively specified by attribute entries 410*a*-410*d* and 450*a*-450*d*. Notably, hard disks 232*a* and 232*b* have common attribute values for attributes queue_depth, q_type, and unique_id. Specifically, hard disks 232*a* and 232*b* each have queue_depth attribute values of "1" as respectively specified by queue_depth default field 413 and 453, q_type values of "single" respectively specified by q_type default field 423 and 463, and unique_id attribute values of null (" ") respectively specified by unique_id default field 433 and 473. In the present example, hard disks 232*a* and 232*b* only have different values for model_map attributes defined by attribute entries 410*d* and 450*d*. Particularly, hard disk 232*a* has a model_map attribute value of "0810MYDISK MODEL ONE" specified by model_map default field 443, and hard disk 232*b* has a model map attribute value of "0810MYDISK MODEL TWO" specified by model_map default field 483. Although hard disk 232*a* and 232*b* have identical attributes of queue_depth, q_type, unique_id, and model_map, separate attribute sets 401 and 402 are required to be maintained in an ODM database due to the different model_map attributes when the ODM and ODM database are configured in a conventional arrangement.

Thus, eight total attribute entries 410*a*-410*d* and 450*a*-450*d* are required for defining attribute sets 401 and 402 of devices 252*a* and 252*b* in the conventional configuration depicted in FIG. 4.

The example attribute entries provided are illustrative only, and attributes of a single device are typically more numerous. For example, typical hard disks often require thirty to forty such attributes for device configuration.

As the number of peripheral deices supported by a system is increased, the requisite number of attribute entries maintained in ODM database 302 increases correspondingly. Disadvantageously, many attribute entries are often redundant as devices have common attributes that share configuration values. In the above example, attribute entries for attributes of queue_depth, q_type, and unique_id are duplicative in that the only difference in attribute entries is in the uniquetype value used for indexing the attribute values for a hard disk assigned to a particular uniquetype. Such replication of device attribute data is wasteful of system resources, e.g., the storage resources required to maintain ODM database 302. Additionally, ODM access is hindered as the number of attribute entries increases resulting in corresponding increases in ODM interrogation and retrieval latencies. Moreover, as the number of attribute entries is increased, maintenance of the ODM data becomes more complex as well.

FIG. 5 is an exemplary configuration of device attribute entries implemented in accordance with a preferred embodiment of the present invention. Data structure 500 comprises attribute subsets 501-503 stored in ODM database 302. A reduction in the amount of attribute entries is obtained by mapping multiple device classifications to a single uniquetype or other device classification identifier. In the illustrative example, the hard disks 232*a* and 232*b* have identical attributes of queue_depth, q_type, unique_id, and model_map with each of attributes queue_depth, q_type and unique_id having identical values as described above. In accordance with a preferred embodiment of the present invention, device classifications having a common set of attributes may be mapped to a common uniquetype or device classification identifier.

In the present example, hard disks 232*a* and 232*b* each have a common set of attributes comprising queue_depth, q_type, unique_id and model_map. A single attribute entry referenced by a uniquetype is recorded in ODM database 302 for both hard disks 232*a* and 232*b* when both hard disks have identical values for a common attribute. For example, attribute entry 510*a* defines the attribute "queue_depth" and includes a uniquetype field 511 with a uniquetype value (disk/fcp/mydisk) that is shared between hard disks 232*a* and 232*b*. In a similar manner, attribute entries 510*b* and 510*c* that respectively define the attributes q_type and unique_id are assigned to both hard disk 232*a* and 232*b*. Accordingly, PdAt entries 510*a*-510*c* respectively define queue_depth, q_type, and unique_id attributes and associated field values for both hard disks 232*a* and 232*b*.

Attribute entry 510*d* is included in ODM database 302 for defining the attribute model_map that has an attribute value unique to a particular device classification. In the present example, attribute entry 510*d* is uniquely assigned to hard disks having a model_map attribute value of "0810MYDISK MODEL ONE", e.g., hard disk 232*a* and other similar classified hard disks, and attribute entry 510*e* is uniquely assigned to hard disks having a model_map attribute value of "0810MYDISK MODEL TWO", e.g., hard disk 232*b* and other similarly classified hard disks. Notably, each of attribute entries 510*d* and 510*e* are uniquely associated with a particular classification of hard disk but share a common device uniquetype.

Thus, devices having identical attribute sets with one or more different attribute values are respectively associated with a set of attribute entries comprising an attribute entry subset shared with other devices of one or more different device classifications and one or more attribute entries that are uniquely associated with the device. In the illustrative example, hard disk 232*a* (and other instances of similarly configured hard disks) has an attribute entry set that comprises an attribute entry subset 501 shared with other device classifications and a attribute entry subset 502 that is only associated with devices having an identical set of attributes and attribute values. In a similar manner, hard disk 232*b* (and other instances of similarly configured hard disks) has an attribute entry set that comprises attribute entry subset 501 also assigned to other devices of different device classifications and attribute entry subset 503 that is uniquely associated with devices having an identical set of attributes and attribute values.

Attribute entries 500 shown in FIG. 5 are representative of a configuration of an ODM database that may be advantageously substituted for the ODM structure shown and described in FIG. 4 for supporting hard disks 232*a* and 232*b* (and other instances of hard disks 232*a* and 232*b*) having the four exemplary attributes of queue_depth, q_type, unique_id, and model_map. Thus, attribute data of hard disks 232*a* and 232*b* are provided by a total of five attribute entries rather than eight attribute entries as required in a conventional configuration. It should be appreciated that as the number of devices supported by ODM 304 is increased or as the number of device attributes is increased, a substantial reduction in ODM database 302 size is obtained by assignment of attribute subsets to devices having common attributes but having one or more different attribute values.

In accordance with another embodiment of the present invention, override default values are provided by an attribute entry that is uniquely associated with a particular device classification. For example, model_map attribute entries are uniquely associated with device instances of a common device classification in the illustrative examples and are used for recording override default values as described below.

Figure 6:
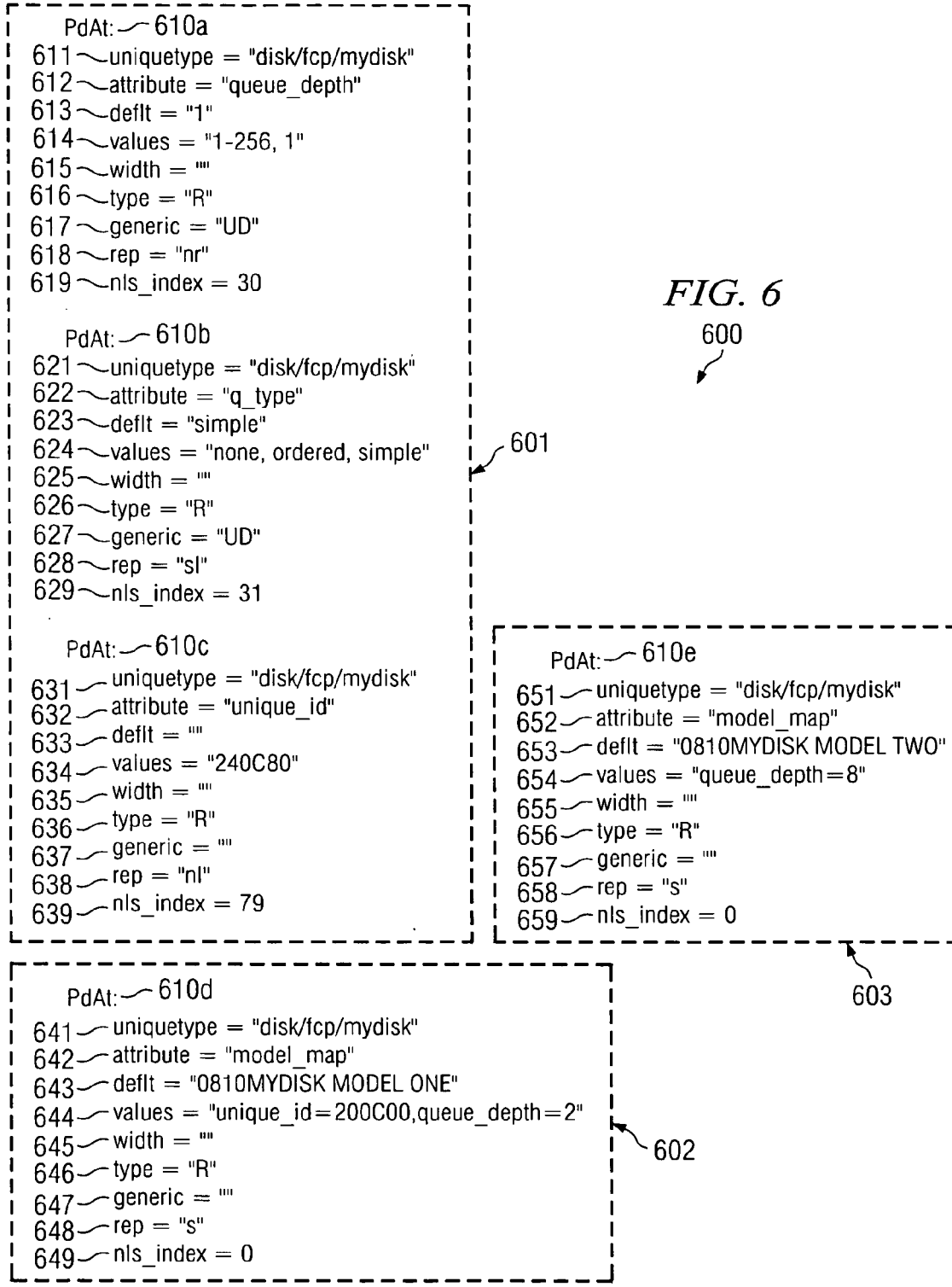
FIG. 6 is an exemplary configuration of device attribute entries providing override attribute values implemented in accordance with a preferred embodiment of the present invention.

FIG. 6 is an exemplary configuration of device attribute entries providing override attribute values implemented in accordance with a preferred embodiment of the present invention. In the illustrative example, hard disks 232*a* and 232*b* are associated with a common uniquetype value "disk/fcp/mydisk" and commonly have attributes of queue_depth, q_type, unique_id, and model_map. Attribute entry subset 601 comprising attribute entries 610*a*-610*c* is commonly associated with hard disks 232*a* and 232*b*. Additionally, attribute entry 610*d* is uniquely associated with hard disk 232*a* having a model_map attribute value of "0810MYDISK MODEL ONE" and attribute entry 610*e* is uniquely associated with hard disk 232*b* having a model_map attribute value of "0810MYDISK MODEL TWO".

Attribute queue_depth has a default value of "1" defined by default field 613 of attribute entry 610*a*. In a similar manner, attribute q_type has a default value of "simple" defined by default field 624 of attribute entry 610*b*, and attribute unique_id has a default value of null (" ") defined by default field 633 of attribute entry 610*c*.

In accordance with a preferred embodiment of the present invention, a field of an attribute entry that is uniquely associated with a particular device classification is used to store override values of attributes that are defined in an attribute entry commonly associated with multiple device classifications. For example, field 644 of attribute entry 610*d* uniquely associated with the device classification of hard disk 232*a* stores an override value of "200C00" for the attribute unique_id and an override value of "2" for the attribute queue_depth. In a similar manner, field 654 of attribute entry 610*e* uniquely associated with the device classification of hard disk 232*b* stores an override value of "8" for the attribute queue_depth.

Thus, classifications of devices sharing a common set of attributes may have a subset of attributes commonly associated with the device classifications but may have override values for one or more of the attributes of the common set of attributes. Accordingly, replication of device attribute entries is advantageously avoided for devices sharing a common set of attributes but that require different attribute values.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for maintaining object configuration data in a data processing system, the method comprising the computer implemented steps of:

said data processing system including a first SCSI hard disk drive and a second SCSI hard disk drive;

said first SCSI hard disk drive manufactured by a first manufacturer and having a first model number, and said second SCSI hard disk drive manufactured by a second manufacturer and having a second model number;

said data processing system executing an Advanced Interactive Executive operating system;

configuring, using said Advanced Interactive Executive operating system, said first SCSI hard disk drive and said second SCSI hard disk drive using a plurality of attributes when said data processing system is booted;

one of said plurality of attributes being a queue depth attribute;

storing only one attribute entry for each one of said plurality of attributes when first values that are associated with said first SCSI hard disk drive for said one of said plurality of attributes are the same as second values that are associated with said second SCSI hard disk drive for said one of said plurality of attributes;

said only one attribute entry associated with both said first SCSI hard disk drive and said second SCSI hard disk drive;

storing said first values in said only one attribute entry, said first values used to configure said first and second SCSI hard disk drives when said data processing system is booted;

storing separate attribute entries for each one of said plurality of attributes when third values that are associated with said first SCSI hard disk drive for said one of said plurality of attributes are different from fourth values that are associated with said second SCSI hard disk drive for said one of said plurality of attributes;

said separate attribute entries including, for each one of said plurality of attributes, a first separate attribute entry that is associated with said first SCSI hard disk drive and a second separate attribute entry that is associated with said second SCSI hard disk drive;

storing said third values in said first separate attribute entry, said third values used to configure said first SCSI hard disk drive;

storing said fourth values in said second separate attribute entry, said fourth values used to configure said second SCSI hard disk drive;

storing said only one attribute entry and said separate attribute entries in an object data manager database that is accessed by an object data manager that runs on said Advanced Interactive Executive operating system;

retrieving, by said object data manager, said only one attribute entry and said separate attribute entries from said object data manager database to configure said first and second hard disk drives;

associating a uniquetype identifier with said first SCSI hard disk drive and said second SCSI hard disk drive, said uniquetype identifier identifying both said first SCSI hard disk drive and said second SCSI hard disk drive;

storing said uniquetype identifier in said only one attribute entry and using said uniquetype identifier to identify said only one attribute entry;

said uniquetype identifier being a concatenation of a device class, a device subclass, and a device type;

said device class being all devices designated as hard disk drives, said device subclass being all disk drives designated as SCSI devices, and said device types being all hard disk drives having a particular storage capacity; and wherein storing said only one attribute entry when said first values are the same as said second values reduces the amount of storage in said object data manager database needed to store attribute entries.

2. The method of claim 1, further comprising:

for a particular one of said plurality of attributes: storing a first override default value in said first separate attribute entry as one of said third values, and storing a second override default value in said second separate attribute entry as one of said fourth values.

3. The method of claim 2, wherein configuring the first object includes:

substituting said first override value for one of said first values in said only one attribute entry.

4. A computer program product that is stored in a computer readable medium for maintaining object configuration data on a data processing system, the computer program product comprising:

said data processing system including a first SCSI hard disk drive and a second SCSI hard disk drive;

said first SCSI hard disk drive manufactured by a first manufacturer and having a first model number, and said second SCSI hard disk drive manufactured by a second manufacturer and having a second model number;

said data processing system executing an Advanced Interactive Executive operating system;

instructions for configuring, using said Advanced Interactive Executive operating system, said first SCSI hard disk drive and said second SCSI hard disk drive using a plurality of attributes when said data processing system is booted;

one of said plurality of attributes being a queue depth attribute;

instructions for storing only one attribute entry for each one of said plurality of attributes when first values that are associated with said first SCSI hard disk drive for said one of said plurality of attributes are the same as second values that are associated with said second SCSI hard disk drive of said one of said plurality of attributes;

said only one attribute entry associated with both said first SCSI hard disk drive and said second SCSI hard disk drive;

instructions for storing said first values in said only one attribute entry, said first values used to configure said first and second SCSI hard disk drives when said data processing system is booted;

instructions for storing separate attribute entries for each one of said plurality of attributes when third values that are associated with said first SCSI hard disk drive for said one of said plurality of attributes are different from fourth values that are associated with said second SCSI hard disk drive for said one of said plurality of attributes;

said separate attribute entries including, for each one of said plurality of attributes, a first separate attribute entry that is associated with said first SCSI hard disk drive and a second separate attribute entry that is associated with said second SCSI hard disk drive;

instructions for storing said third values in said first separate attribute entry, said third values used to configure said first SCSI hard disk drive;

instructions for storing said fourth values in said second separate attribute entry, said fourth values used to configure said second SCSI hard disk drive;

instructions for storing said only one attribute entry and said separate attribute entries in an object data manager database that is accessed by an object data manager that runs on said Advanced Interactive Executive operating system;

instructions for retrieving, by said object data manager, said only one attribute entry and said separate attribute entries from said object data manager database to configure said first and second hard disk drives;

instructions for associating a uniquetype identifier with said first SCSI hard disk drive and said second SCSI hard disk drive, said uniquetype identifier identifying both said first SCSI hard disk drive and said second SCSI hard disk drive;

instructions for storing said uniquetype identifier in said only one attribute entry and using said uniquetype identifier to identify said only one attribute entry;

said uniquetype identifier being a concatenation of a device class, a device subclass, and a device type;

said device class being all devices designated as hard disk drives, said device subclass being all disk drives designated as SCSI devices, and said device types being all hard disk drives having a particular storage capacity; and wherein storing said only one attribute entry when said first values are the same as said second values reduces the amount of storage in said object data manager database needed to store attribute entries.

5. The computer program product of claim 4, further comprising:

a particular one of said plurality of attributes: instructions for storing a first override default value in said first separate attribute entry as one of said third values, and instructions for storing a second override default value in said second separate attribute entry as one of said fourth values.

6. The computer program product of claim 5, further comprising:

instructions for substituting said first override value for one of said first values in said only one attribute entry.

7. A data processing system for maintaining object configuration data, comprising:

said data processing system including a first SCSI hard disk drive and a second SCSI hard disk drive;

said first SCSI hard disk drive manufactured by a first manufacturer and having a first model number, and said second SCSI hard disk drive manufactured by a second manufacturer and having a second model number;

said data processing system executing an Advanced Interactive Executive operating system;

said Advanced Interactive Executive operating system for configuring said first SCSI hard disk drive and said second SCSI hard disk drive using a plurality of attributes when said data processing system is booted;

one of said plurality of attributes being a queue depth attribute;

an object data manager database for storing only one attribute entry for each one of said plurality of attributes when first values that are associated with said first SCSI hard disk drive for said one of said plurality of attributes are the same as second values that are associated with said second SCSI hard disk drive for said one of said plurality of attributes;

said only one attribute entry associated with both said first SCSI hard disk drive and said second SCSI hard disk drive;

said object data manager database for storing said first values in said only one attribute entry, said first values used to configure said first and second SCSI hard disk drives when said data processing system is booted;

said object data manager database for storing separate attribute entries for each one of said plurality of attributes when third values that are associated with said first SCSI hard disk drive for said one of said plurality of attributes are different from fourth values that are associated with said second SCSI hard disk drive for said one of said plurality of attributes;

said separate attribute entries including, for each one of said plurality of attributes, a first separate attribute entry that is associated with said first SCSI hard disk drive and a second separate attribute entry that is associated with said second SCSI hard disk drive;

said object data manager database for storing said third values in said first separate attribute entry, said third values used to configure said first SCSI hard disk drive;

said object data manager database for storing said fourth values in said second separate attribute entry, said fourth values used to configure said second SCSI hard disk drive;

said object data manager database accessed by an object data manager that runs on said Advanced Interactive Executive operating system;

said object data manager retrieving said only one attribute entry and said separate attribute entries from said object data manager database to configure said first and second hard drives;

said object data manager database for storing a uniquetype identifier, said uniquetype identifier associated with said first SCSI hard disk drive and with said second SCSI hard disk drive, said uniquetype identifier identifying both said first SCSI hard disk drive and said second SCSI hard disk drive;

said object data manager database for storing said uniquetype identifier in said only one attribute entry and using said uniquetype identifier to identify said only one attribute entry;

said uniquetype identifier being a concatenation of a device class, a device subclass, and a device type;

said device class being all devices designated as hard disk drives, said device subclass being all disk drives designated as SCSI devices, and said device types being all hard disk drives having a particular storage capacity; and wherein storing said only one attribute entry when said first values are the same as said second values reduces the amount of storage in said object data manager database needed to store attribute entries.

8. The data processing system of claim 7, further comprising:

for a particular one of said plurality of attributes: storing a first override default value in said first separate attribute entry as one of said third values, and storing a second override default value in said second separate attribute entry as one of said fourth values.

9. The data processing system of claim 8, wherein the processing unit substitutes said first override value for one of said first values in said only one attribute entry.

* * * * *